United States Patent
Sung et al.

(10) Patent No.: US 8,275,366 B2
(45) Date of Patent: Sep. 25, 2012

(54) METHOD AND APPARATUS FOR AUTOMATICALLY CHANGING A CALL RECEIVE MODE IN A MOBILE TERMINAL

(75) Inventors: Yeul-Tak Sung, Seoul (KR); Beom-Soo Cho, Suwon-si (KR); Sung Kwon, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 12/589,328

(22) Filed: Oct. 22, 2009

(65) Prior Publication Data
US 2010/0105374 A1 Apr. 29, 2010

(30) Foreign Application Priority Data
Oct. 23, 2008 (KR) .................. 10-2008-0103971

(51) Int. Cl.
H04M 3/00 (2006.01)
H04M 1/00 (2006.01)
(52) U.S. Cl. .............. 455/418; 455/567; 455/412.2
(58) Field of Classification Search .............. None
See application file for complete search history.

(56) References Cited

U.S. PATENT DOCUMENTS

| | | | | |
|---|---|---|---|---|
| 7,469,155 | B2 * | 12/2008 | Chu | 455/567 |
| 2002/0010008 | A1 * | 1/2002 | Bork et al. | 455/567 |
| 2002/0032040 | A1 * | 3/2002 | Tsukamoto | 455/556 |
| 2004/0127198 | A1 * | 7/2004 | Roskind et al. | 455/412.2 |
| 2004/0176031 | A1 * | 9/2004 | Haller et al. | 455/41.2 |
| 2005/0289219 | A1 * | 12/2005 | Nazzal | 709/203 |
| 2006/0116175 | A1 * | 6/2006 | Chu | 455/567 |
| 2007/0082712 | A1 * | 4/2007 | Ikeda et al. | 455/567 |

FOREIGN PATENT DOCUMENTS
KR 2003-0000713 1/2003
* cited by examiner

*Primary Examiner* — Jinsong Hu
*Assistant Examiner* — William Nealon

(57) ABSTRACT

A method and apparatus for automatically changing a call receive mode in a mobile terminal includes a first process of identifying a current external illumination level and noise level and identifying a preset execution suitability of each call receive mode, a second process of identifying a current user schedule and identifying a preset execution suitability of each call receive mode, a third process of identifying a current position coordinate and calculating a use ratio of each call receive mode, a fourth process of identifying a previous use history of each call receive mode and calculating a current execution suitability by each call receive mode, and a fifth process of calculating an integrated execution suitability of each call receive mode and applying a call receive mode of the highest value.

24 Claims, 2 Drawing Sheets

METHOD AND APPARATUS FOR AUTOMATICALLY CHANGING A CALL RECEIVE MODE IN A MOBILE TERMINAL

CROSS-REFERENCE TO RELATED APPLICATION AND CLAIM OF PRIORITY

This application claims priority under 35 U.S.C. §119(a) to a Korean Patent Application filed in the Korean Intellectual Property Office on Oct. 23, 2008 and assigned Serial No. 10-2008-0103971, the contents of which are herein incorporated by reference.

TECHNICAL FIELD OF THE INVENTION

The present invention relates to a mobile terminal. More particularly, the present invention relates to a method and apparatus for automatically changing a call receive mode based on situation recognition to maximize a user's convenience.

BACKGROUND OF THE INVENTION

Generally, when a call signal is received, a mobile terminal informs a user of call signal reception in a corresponding call receive mode. Here, the user of the mobile terminal selects a call receive mode such as a vibration, a ring, and so forth, from a menu for call receive mode setting so as to directly determine a peripheral situation and set the call receive mode.

However, a user may fail to recognize that it is required to change a call receive mode, thus missing changing into a suitable call receive mode. Because of this, the user may miss a reception of a busy signal or fail to observe etiquette for others due to a notification of a call receive mode not suitable to the situation.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide a method and apparatus for automatically changing a call receive mode in a mobile terminal, for automatically applying the most suitable call receive mode considering a user's current situation.

Another aspect of the present invention is to provide a method and apparatus for automatically changing a call receive mode in a mobile terminal, for allowing a user to lead an application of the most suitable call receive mode considering all of user's call receive mode use history and schedule specifications as well as an external environment variables, thus increasing a user's convenience.

The above aspects are achieved by providing a method and apparatus for automatically changing a call receive mode in a mobile terminal.

In accordance with an aspect of the present invention, a method for automatically changing a call receive mode in a mobile terminal is provided. The method includes a first process of identifying a current external illumination level and noise level and, according to the identified external illumination level and noise level, identifying a preset execution suitability of each call receive mode, a second process of identifying a current user schedule and, according to the identified schedule, identifying a preset execution suitability of each call receive mode, a third process of identifying a current position coordinate and calculating a use ratio of each call receive mode corresponding to an execution suitability within a predetermined radius range starting from the identified position coordinate, a fourth process of identifying a previous use history of each call receive mode and calculating a current execution suitability by each call receive mode, and a fifth process of calculating an integrated execution suitability of each call receive mode from results acquired in at least one or more of the first to fourth processes, and applying a call receive mode of the highest value.

In accordance with another aspect of the present invention, an apparatus for automatically changing a call receive mode in a mobile terminal is provided. The apparatus includes an external environment sensor, a schedule reference unit, a mode use history unit, and a controller. The external environment sensor senses an external illumination level and noise level, and a position coordinate. The schedule reference unit manages a schedule. The mode use history unit manages a use history of a call receive mode. The controller performs a first algorithm of identifying a current external illumination level and noise level through the external environment sensor and, according to the identified external illumination level and noise level, identifying a preset execution suitability of each call receive mode, a second algorithm for identifying a current user schedule through the schedule reference unit and, according to the identified schedule, identifying a preset execution suitability of each call receive mode, a third algorithm of identifying a current position coordinate through the external environment sensor and calculating a use ratio of each call receive mode corresponding to an execution suitability within a predetermined radius range starting from the identified position coordinate, a fourth algorithm of identifying a previous use history of each call receive mode from the mode use history unit and calculating a current execution suitability of each call receive mode, and a fifth algorithm of calculating an integrated execution suitability of each call receive mode from results acquired in at least one or more of the first to fourth algorithms and applying a call receive mode of the highest value.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF EXEMPLARY EMBODIMENTS

Figure 1:
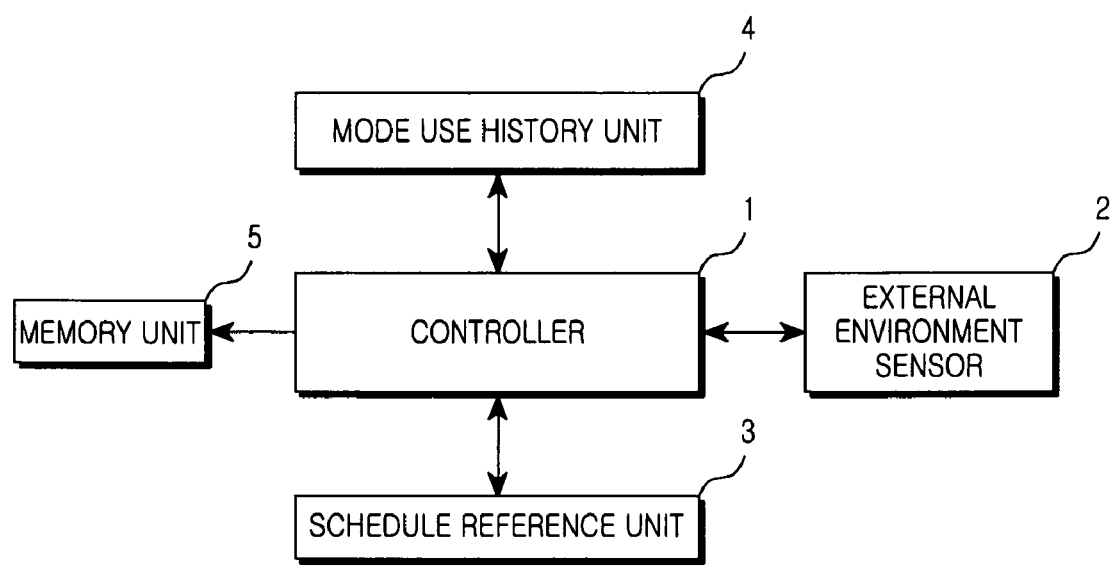
FIG. 1 illustrates a block diagram for an apparatus for automatically changing a call receive mode in a mobile terminal according to an exemplary embodiment of the present invention.
Figure 2:
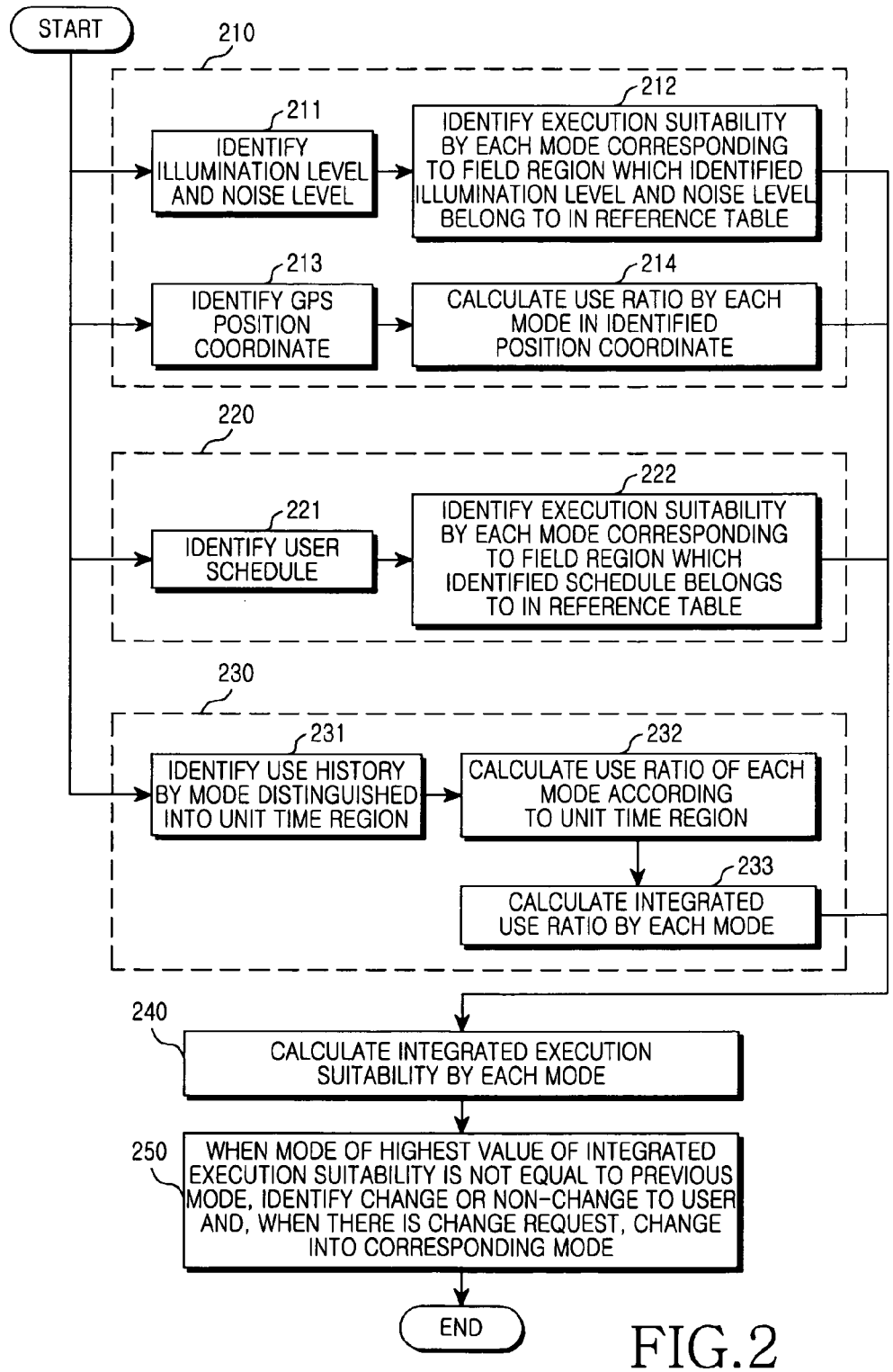
FIG. 2 illustrates a flow diagram for a procedure of automatically changing a call receive mode in a mobile terminal according to an exemplary embodiment of the present invention.

FIGS. 1 and 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention relates to a mobile terminal. Particularly, a technology for a method and apparatus for automatically changing a call receive mode based on situation recognition to maximize a user's convenience according to an exemplary embodiment of the present invention is described below. That is, the present invention provides a method and apparatus for automatically changing a call receive mode in a mobile terminal, for automatically applying a suitable call receive mode integratedly considering a user's schedule and a user's call receive mode use history as well as a current external environment condition (e.g., a noise level, an illumination level, and so forth).

FIG. 1 illustrates a block diagram for an apparatus for automatically changing a call receive mode in a mobile terminal according to an exemplary embodiment of the present invention.

Referring to FIG. 1, the automatic changing apparatus of the mobile terminal includes a controller 1, an external environment sensor 2, a schedule reference unit 3, a mode use history unit 4, and a memory unit 5.

The controller 1 can control to receive data provided from the external environment sensor 2, the schedule reference unit 3, and the mode use history unit 4 and can apply a call receive mode most suitable at a present time. Its detailed description is made later in FIG. 2.

The external environment sensor 2 can measure a peripheral illumination level and noise level. The external environment sensor 2 includes an illumination and noise sensor device for illumination and noise level measurement. Further, the external environment sensor 2 includes a Global Positioning System (GPS) receiving device, and acquires a position coordinate from the GPS receiving device.

The schedule reference unit 3 can manage a schedule that is set through a manner that a user selects following the guidance of a schedule menu or directly inputs using a keyboard in the mobile terminal. The schedule refers to a plan that a user makes depending upon time.

The mode use history unit 4 can manage a mode use history in which a user recognizes that it is required to change a call receive mode in the mobile terminal and directly selects and applies a corresponding mode following a menu guidance. Also, the mode use history unit 4 can manage a use history of a call receive mode that tracks when a user allows a change and applies in a process of inquiring of a user whether to change a call receive mode when automatically changing the call receive mode according to the present invention.

The mode use history unit 4 distinguishes a use history value by each call receive mode (SDBm(Mode), m={Hour, Week, Month, Holiday}) into a unit time region such as 'Hour' (00 hour to 23 hours), 'Week' (Monday to Sunday), 'Month' (January to December), 'Holiday', and so forth, and records the use history value. Table 1 below shows a reference table of recording, by minutes, a history value (SDBHour (Mode)) occupied by each call receive mode with respect to the 'Hour' (00 hour to 23 hours). For example, an SDBHour (vibration) value of '70' in a vibration mode of '00 hour' means occupying 70 minutes by a vibration in an 'Hour' zone corresponding to the '00 hour'. Also, the mode use history unit 4 includes a reference table of recording a history value (i.e., an SDBWeek(Mode), an SDBMonth(Mode)) occupied by each call receive mode even with respect to the 'Week', the 'Month', and so forth.

TABLE 1

|  | Vibration | Bell, gradually high | Bell | Lamp | Bell after vibration | Vibration and bell | Vibration and bell, gradually high | None |
| --- | --- | --- | --- | --- | --- | --- | --- | --- |
| 00 hour | 70 | 20 | 30 | 0 | 10 | 0 | 10 | 0 |
| 01 hour | 30 | 20 | 20 | 5 | 10 | 20 | 15 | 0 |
| ... | | | | | | | | |
| 23 hours | 30 | 10 | 30 | 0 | 20 | 20 | 10 | 0 |

More particularly, for example, it is assumed that a current time is equal to '18 hours, Wednesday, 8 Oct. 2008' and, during an early one hour, a vibration is used for 40 minutes and a bell is used for 20 minutes. The mode use history unit 4 adds the '40 minutes' to a vibration mode history value (SDBHour(vibration)) of a '18 hours' field of an 'Hour' table, and adds the '20 minutes' to a bell mode history value (SDBHour (bell)). Also, the mode use history unit 4 adds the '40 minutes' to a vibration mode history value (SDBWeek(vibration)) of a 'Wednesday' field of a 'Day (Week)' table not shown, and adds the '20 minutes' to a bell mode history value (SDBWeek (bell)). Further, the mode use history unit 4 adds the '40 minutes' to a vibration mode history value (SDBMonth(vibration)) of an 'October' field of a 'Month' table not shown, and adds the '20 minutes' to a bell mode history value (SDBMonth(bell)). Furthermore, the mode use history unit 4 adds the '40 minutes' to a vibration mode history value (SDBHoliday(vibration)) of a 'Holiday' field of a 'Holiday' table, and adds the '20 minutes' to a bell mode history value (SDBHoliday(bell)).

Also, the mode use history unit 4 manages a history of a mode executed by a user within a predetermined range starting from a position coordinate measured in the GPS device of the external environment sensor 2. That is, the mode use history unit 4 finds a previously stored position coordinate within a predetermined radius range on the basis of a current position, and records the number of times of application of call receive modes mapped with it or a use time.

The memory unit 5 stores data provided from the external environment sensor 2, the schedule reference unit 3, and the mode use history unit 4. Particularly, the memory unit 5 includes an algorithm for referring to an execution suitability of each mode in an illumination level and noise level currently measured in the external environment sensor 2. Also, the memory unit 5 includes an algorithm for referring to an execution suitability of each mode in a schedule identified in the schedule reference unit 3. Further, the memory unit 5 includes an algorithm for identifying a history value by each mode for each unit time region in each unit time region (i.e., 'Hour', 'Week', 'Month', 'Holiday', and so forth) in the mode use history unit 4 and calculating a use ratio by each mode for the whole mode.

Thus, the controller 1 can receive data provided from the external environment sensor 2, the schedule reference unit 3, and the mode use history unit 4, perform each algorithm of the memory unit 5, and can apply a call receive mode most suitable at a current time. Its detailed description will be made later in FIG. 2.

present invention does not sensitively correspond to a sudden change of the illumination level and noise level.

$$\text{Noise}_{n+1} = \alpha \cdot \text{Noise}_n + (1-\alpha) \cdot \text{Noise}_{new}$$

where, $\alpha \leq 1$ $$\text{Illum}_{n+1} = \alpha \cdot \text{Illum}_n + (1-\alpha) \cdot \text{Illum}_{new}$$

where, $\alpha \leq 1$ [Eqn. 1]

In Equation 1, the $\text{Noise}_{new}$ and $\text{Illum}_{new}$ represent a current noise level and illumination level measured in the external environment sensor 2. Also, the $\text{Noise}_n$ and $\text{Illum}_n$ represent a previously measured noise level and illumination level, and the $\text{Noise}_{n+1}$ and $\text{Illum}_{n+1}$ represent an averaged noise level and illumination level.

Thereafter, in step 212, the controller 1 identifies a call receive mode suitable for execution according to an illumination level step and noise level step to which the average values of the calculated illumination level and noise level belong. Table 2 below shows a reference table representing a preset execution suitability of each mode according to the illumination level step and noise level step which the average values of the illumination level and noise level belong to. That is, the controller 1 identifies an execution suitability by each mode (i.e., a noise (mode) and an illumination (mode)) corresponding to a field region which the determined external environment condition belongs to, in the reference table of previously storing the preset execution suitability of each mode.

TABLE 2

| Step/mode | Vibration | Bell, gradually high | Bell | Lamp | Bell after vibration | Vibration and bell | Vibration and bell, gradually high | None |
|---|---|---|---|---|---|---|---|---|
| Quiet | 45 | 5 | 10 | 5 | 15 | 5 | 10 | 5 |
| Normal | 10 | 45 | 15 | 0 | 5 | 10 | 15 | 0 |
| Noisy | 20 | 5 | 0 | 0 | 10 | 45 | 20 | 0 |
| Dark | 45 | 5 | 10 | 5 | 15 | 5 | 10 | 5 |
| Normal | 20 | 0 | 25 | 15 | 15 | 15 | 10 | 0 |
| Bright | 20 | 5 | 40 | 0 | 0 | 45 | 20 | 0 |

FIG. 2 illustrates a flow diagram for a procedure of automatically changing a call receive mode in a mobile terminal according to an exemplary embodiment of the present invention.

Referring to FIG. 2, in step 210, the controller 1 performs an algorithm of identifying an illumination level and noise level measured in the external environment sensor 2 and calculating an execution suitability by each mode from the measured illumination level and noise level. Also, the controller 1 performs an algorithm for identifying a current position coordinate measured in the external environment sensor 2 and calculating a use ratio of each mode used by a user in the identified current position coordinate to the whole mode.

More particularly, in step 211, the controller 1 identifies the illumination level and noise level currently measured in the external environment sensor 2. At this time, the controller 1 may selectively apply a call receive mode according to a step which an external environment variable of the illumination level and noise level, and so forth, identified in the external environment to which sensor 2 belongs. At this time, the controller 1 averages the illumination level and noise level using a method of Exponential Weighter Moving Average (EWMA) of Equation 1 below, and the like, such that automatic application of a call receive mode according to the Further, in step 213, the controller 1 identifies a current position coordinate acquired by the GPS receiving device of the external environment sensor 2. Then, in step 214, the controller 1 performs an algorithm of calculating a use ratio (i.e., an execution suitability) (GPSStatistic(Mode)) by each mode of each call receive mode executed by a user to the whole mode within a predetermined range starting from the current position coordinate in the mode use history unit 4. As discussed hereinabove, the mode use history unit 4 manages a history of a call receive mode executed by a user within the predetermined range starting from the position coordinate measured in the GPS device of the external environment sensor 2. For example, it is assumed that the controller 1 identifies, in the mode use history unit 4, a history in which a vibration mode is applied 10 times and a bell mode is applied 20 times within a specific radius of a current coordinate. Thereafter, the controller 1 calculates 10/(10+20) that is a use ratio (GPSStatistic(vibration)) of a vibration mode within a specific radius, and 20/(10+20) that is a use ratio (GPSStatistic(bell)) of a bell mode.

Then, in step 220, the controller 1 performs an algorithm of identifying a current schedule in the schedule reference unit 3 and then, calculating an execution suitability by each mode (i.e., BusinessType(Mode) and PlaceType(Mode)) for the identified schedule.

More particularly, in step 221, the controller 1 identifies a current schedule in the schedule reference unit 3. At this time, with the schedule identified in the schedule reference unit 3 as a variable, the controller 1 can selectively apply a call receive mode according to the variable. Then, in step 222, the controller 1 identifies an execution suitability by each call receive mode according to the identified current schedule. Table 3 below shows a reference table representing a preset execution suitability of each mode according to each schedule. That is, the controller 1 identifies an execution suitability by each mode corresponding to a field region which a presently identified schedule belongs to, in the reference table of storing the preset execution suitability of each mode.

TABLE 3

| Schedule/mode | Vibration | Bell, gradually high | Bell | Lamp | Bell after vibration | Vibration and bell | Vibration and bell, gradually high | None |
|---|---|---|---|---|---|---|---|---|
| Watching | 40 | 5 | 10 | 10 | 20 | 0 | 5 | 10 |
| Joining | 10 | 3 | 5 | 0 | 10 | 31 | 10 | 0 |
| Conference/lesson | 55 | 5 | 5 | 10 | 5 | 5 | 5 | 10 |
| Rest | 5 | 5 | 10 | 45 | 0 | 0 | 0 | 45 |
| Sports | 20 | 20 | 0 | 0 | 0 | 60 | 0 | 0 |
| Remark | 35 | 35 | 0 | 0 | 0 | 30 | 0 | 0 |
| Inside | 30 | 10 | 10 | 5 | 20 | 10 | 10 | 5 |
| Outside | 10 | 20 | 10 | 0 | 10 | 35 | 5 | 0 |

Referring to Table 3, for example, the controller 1 identifies that a present schedule is 'sports' and 'inside', from the schedule reference unit 3. Then, the controller 1 identifies an execution suitability (BusinessType(Mode)) by call receive mode for the 'sports' schedule in the reference table. Also, the controller 1 identifies an execution suitability (PlaceType(Mode)) by call receive mode for the 'inside' schedule in the reference table.

Further, regarding the schedule, as in Table 3, a user can reserve a schedule selected at a corresponding time to arrive by selection in a menu of selecting a schedule kind such as preset 'watching', 'rest', 'inside', 'outside', and so forth.

Furthermore, the schedule can be reserved in a manner that a user directly inputs a character using a keyboard. Here, the controller 1 can perform character recognition for identifying a character for a directly inputted schedule in the schedule reference unit 3, reading the identified character, and matching the read character with a corresponding schedule kind. At this time, for the schedule matched through the character recognition, the controller 1 can identify an execution suitability of each call receive mode in a corresponding reference table as above.

Then, in step 230, the controller 1 performs an algorithm for identifying a use history by each mode in the mode use history unit 4, obtaining a use ratio by each mode on a per-unit-time-region basis, performing integration and calculation, and determining a call receive mode most suitable to a current time zone.

More particularly, in step 231, the controller 1 identifies a history value of each call receive mode corresponding to a current time in the aforementioned reference table of the 'Hour' table, the 'Day' table, the 'Month' table, and so forth, distinguished into the unit time region, in the mode use history unit 4, respectively.

Then, in step 232, the controller 1 calculates a use ratio by each mode for the whole call receive mode in the reference table of the 'Hour' table, the 'Day' table, the 'Month' table, the 'Holiday' table, and so forth. In order to calculate the use ratio by each mode, the controller 1 can use Equation 2 below.

$$STAT_m(\text{Mode}) = \frac{SDB_m(\text{Mode})}{\sum_{n \in \forall MODE} SDB_m(n)} \quad [\text{Eqn. 2}]$$

$$m = \{\text{Hour, Week, Month, Holiday}\}$$

In Equation 2, the $SDB_m(\text{Mode})$ is a history value of each call receive mode corresponding to a current time in the reference table of the 'Hour' table, the 'Day' table, the 'Month' table, and so forth in step 231. Also, the $STAT_m(\text{Mode})$ represents a ratio of the $SDB_m(\text{Mode})$ to the whole mode. For example, if the current time is equal to '18 hours, Wednesday, 8 Oct. 2008', the controller 1 calculates the following by each mode based on 'Month'.

$STAT_{month}(\text{vibration})$=total sum (minutes) of time for which vibration is selected in October/(total sum of time for which vibration is selected in October+total sum of time for which bell is selected in October+ . . . )

$STAT_{month}(\text{bell})$=total sum (minutes) of time for which bell is selected in October/(total sum of time for which vibration is selected in October+total sum of time for which bell is selected in October+ . . . ), and so forth.

Further, the controller 1 calculates the following by each mode based on 'Day (Week)'.

$STAT_{week}(\text{vibration})$=total sum (minutes) of time for which vibration is selected on Wednesday/(total sum of time for which vibration is selected on Wednesday+total sum of time for which bell is selected on Wednesday+ . . . )

$STAT_{week}(\text{bell})$=total sum (minutes) of time for which bell is selected on Wednesday/(total sum of time for which vibration is selected on Wednesday+total sum of time for which bell is selected on Wednesday+ . . . ), and so forth.

As in the above example, the controller 1 calculates 'STAThour(mode)' by each mode based on 'Hour'. Further, the controller 1 calculates STATholiday(mode) by each mode based on 'Holiday'.

Then, in step 233, the controller 1 integrates use rates of the calculated 'STATmonth(mode)', 'STATweek(mode)', 'STAThour(mode)', 'STATholiday(mode)' by each mode, and calculates an integrated use ratio (ModeStatistic(mode)) by each mode. Equation 3 below is an equation for calculating the integrated use ratio (ModeStatistic(mode)) by each mode. The highest value among the integrated use ratios by each mode calculated in Equation 3 represents if a user primarily sets any call receive mode considering a current time zone.

$$\text{ModeStatistic(Mode)} = a \cdot \text{STAT}_{Hour}(\text{Mode}) + b \cdot \text{STAT}_{Week}(\text{Mode}) + c \cdot \text{STAT}_{Month}(\text{Mode}) + d \cdot \text{STAT}_{Holiday}(\text{Mode})$$

where, $a+b+c+d=1$  [Eqn. 3]

Then, in step 240, the controller 1 integrates the values calculated in steps 210, 220, 230, and 240 and calculates an integrated execution suitability (ModeIndex(Mode)) of each mode.

Then, in step 250, when a corresponding mode of the highest integrated execution suitability calculated in step 240 is not equal to a previous mode, the controller 1 inquires of a user an intention to change into the corresponding mode. At this time, if the user requests to change into the corresponding mode, the controller 1 controls to change into the corresponding mode. Equation 4 below is an equation for calculating the integrated execution suitability.

$$\text{ModeIndex(Mode)} = a \cdot \text{Noise(Mode)} + b \cdot \text{Illumination(Mode)} + c \cdot \text{BusinessType(Mode)} + d \cdot \text{PlaceType(Mode)} + e \cdot \text{GPSStatistic(Mode)} + f \cdot \text{ModeStatistic(Mode)}$$

where, $a+b+c+d+e+f=1$  [Eqn. 4]

Desirably, in calculating the integrated execution suitability by each mode of step 240, the present invention may use at least one or more of steps 210, 220, and 230.

Accordingly, the method and apparatus for automatically changing the call receive mode in the mobile terminal according to an exemplary embodiment of the present invention can automatically provide the most suitable call receive mode considering a user's current situation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for automatically changing a call receive mode in a mobile terminal, the method comprising:
    identifying, by a first process, a current external illumination level and noise level;
    according to the identified external illumination level and noise level, identifying a first preset execution suitability of each call receive mode;
    identifying, by a second process, a current user schedule;
    according to the identified schedule, identifying a second preset execution suitability of each call receive mode;
    identifying, by a third process, a current position coordinate and determining an execution suitability corresponding to a use ratio of previous usage of each call receive mode within a predetermined radius range starting from the identified position coordinate;
    identifying, by a fourth process, a previous use history of each call receive mode and determining a current execution suitability by each call receive mode; and
    calculating, by a fifth process, an integrated execution suitability of each call receive mode from results acquired in one or more of the first to fourth processes, and selecting the call receive mode having the highest integrated execution suitability.

2. The method of claim 1, wherein the first process identifies an execution suitability of each call receive mode according to a step which a current external illumination level and noise level belong to in a preset illumination level step and noise level step.

3. The method of claim 1, wherein the first process identifies a preset execution suitability of each call receive mode according to a step to which a value averaging a previous external illumination level and noise level and the identified external illumination level and noise level by Exponential Weighter Moving Average (EWMA) belongs.

4. The method of claim 1, wherein identifying a previous use history of each call receive mode comprises:
    determining a use ratio of each call receive mode by at least one unit time region, applying a preset weight to each determined use ratio, adding the determined use ratios by unit time region, and determining a current execution suitability of each call receive mode.

5. The method of claim 1, wherein, if a call receive mode to be changed is different from a previous call receive mode, the method identifies a change to a user.

6. The method of claim 4, wherein the at least one unit time region comprises at least one or more of an 'Hour' region, a 'Week' region, a 'Month' region, and a 'Holiday' region.

7. The method of claim 1, further comprising:
    after calculating by the fifth process, updating and storing the previous use history of each call receive mode.

8. The method of claim 1, wherein the schedule comprises an 'inside' and an 'outside'.

9. The method of claim 1, wherein the schedule is selected by a user in a preset menu or is input using a keyboard.

10. The method of claim 9, wherein the second process comprises recognizing that a schedule that the user inputs using the keyboard among previously stored schedules is matched.

11. The method of claim 1, wherein the fifth process applies a preset weight, sums up results of the first to fourth processes, and determines the integrated execution suitability.

12. The method of claim 1, wherein the first to fourth processes are one of:
    performed substantially simultaneously; and,
    according to a preset priority, are sequentially performed.

13. An apparatus for automatically changing a call receive mode in a mobile terminal, the apparatus comprising:
    an external environment sensor configured to sense an external illumination level and noise level, and a position coordinate;
    a schedule reference unit configured to manage a schedule;
    a mode use history unit configured to manage a use history of a call receive mode; and
    a controller configured to:
        perform a first process to identify a current external illumination level and noise level through the external environment sensor and, according to the identified external illumination level and noise level, identify a first preset execution suitability of each call receive mode,
        perform a second process to identify a current user schedule through the schedule reference unit and, according to the identified schedule, identify a second preset execution suitability of each call receive mode,
        perform a third process to identify a current position coordinate through the external environment sensor and determine an execution suitability corresponding to a use ratio of previous usage of each call receive mode within a predetermined radius range starting from the identified position coordinate, perform a fourth process to identify a previous use history of each call receive mode from the mode use history unit and determine a current execution suitability of each call receive mode, and perform a fifth process to determine an integrated execution suitability of each call receive mode from results acquired in one or more of the first to fourth processes and select the call receive mode having the highest integrated execution suitability.

14. The apparatus of claim 13, wherein, in the first process, the controller identifies an execution suitability of each call receive mode according to a step which a current external illumination level and noise level belong to in a preset illumination level step and noise level step.

15. The apparatus of claim 13, wherein the controller identifies a preset execution suitability of each call receive mode according to a step to which a value averaging a previous external illumination level and noise level and the identified external illumination level and noise level by Exponential Weighter Moving Average (EWMA) belongs.

16. The apparatus of claim 13, wherein, after calculating a use ratio of each call receive mode by at least one unit time region, in the fourth process, the controller applies a preset weight to each determined use ratio, adds the determined use ratios by unit time region, and determines a current execution suitability of each call receive mode.

17. The apparatus of claim 13, wherein, if a call receive mode to be changed is different from a previous call receive mode, the controller identifies a change to a user.

18. The apparatus of claim 16, wherein the at least one unit time region comprises at least one or more of an 'Hour' region, a 'Week' region, a 'Month' region, and a 'Holiday' region.

19. The apparatus of claim 13, wherein, after performing the fifth process, the controller controls to update and store the use history of each call receive mode.

20. The apparatus of claim 13, wherein the schedule comprises an 'inside' and an 'outside'.

21. The apparatus of claim 13, wherein the schedule is selected by a user in a preset menu or is input using a keyboard.

22. The apparatus of claim 21, wherein, in the second process, the controller identifies that a schedule inputted by the user using the keyboard among previously stored schedules is matched.

23. The apparatus of claim 13, wherein, in the fifth process, the controller applies a preset weight, sums up results of the first to fourth processes, and determines the integrated execution suitability.

24. The apparatus of claim 13, wherein the controller is configured to one of:

substantially simultaneously perform the first to fourth processes, and according to a preset priority, sequentially performs the first to fourth processes.

\* \* \* \* \*